(12) United States Patent
Mukherjee et al.

(10) Patent No.: US 12,664,234 B2
(45) Date of Patent: Jun. 23, 2026

(54) HYBRID QUANTUM COMPUTING SYSTEM FOR HYPER PARAMETER OPTIMIZATION IN MACHINE LEARNING

(71) Applicant: BANK OF AMERICA CORPORATION, Charlotte, NC (US)

(72) Inventors: Maharaj Mukherjee, Poughkeepsie, NY (US); Utkarsh Raj, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 973 days.

(21) Appl. No.: 17/746,574

(22) Filed: May 17, 2022

(65) Prior Publication Data

US 2023/0401284 A1 Dec. 14, 2023

(51) Int. Cl.
G06F 18/214 (2023.01)
G06N 10/40 (2022.01)
G06N 10/60 (2022.01)

(52) U.S. Cl.
CPC ........... G06F 18/214 (2023.01); G06N 10/40 (2022.01); G06N 10/60 (2022.01)

(58) Field of Classification Search
CPC ..................................................... G06F 18/214
USPC ..................................................... 706/12, 62
See application file for complete search history.

(56) References Cited

U.S. PATENT DOCUMENTS

| | | | |
|---|---|---|---|
| 9,537,953 | B1 | 1/2017 | Dadashikelayeh et al. |
| 10,275,721 | B2 | 4/2019 | Dukatz et al. |
| 10,592,216 | B1 | 3/2020 | Richardson et al. |
| 10,817,337 | B1 | 10/2020 | Richardson et al. |
| 10,977,570 | B2 | 4/2021 | Smith et al. |
| 11,170,137 | B1 | 11/2021 | Richardson et al. |
| 11,270,220 | B1 | 3/2022 | Richardson et al. |
| 11,308,248 | B2 | 4/2022 | Matsuura et al. |
| 11,334,667 | B1 | 5/2022 | Ramanathan et al. |
| 11,336,462 | B1 | 5/2022 | Maganti et al. |
| 11,366,897 | B1 | 6/2022 | Ramanathan et al. |
| 11,436,519 | B1 | 9/2022 | Dridi et al. |
| 11,514,134 | B2 | 11/2022 | Ronagh et al. |

(Continued)

FOREIGN PATENT DOCUMENTS

| | | | | |
|---|---|---|---|---|
| CN | 103001875 B | 3/2015 | | |
| WO | WO-2022232604 A1 * | 11/2022 | ............. | G06N 10/20 |
| WO | WO-2023195922 A1 * | 10/2023 | ............. | G06N 10/60 |

*Primary Examiner* — Ruay Ho

(74) *Attorney, Agent, or Firm* — Moore & Van Allen PLLC; Anoohya Yarlagadda

(57) ABSTRACT

A system for performing optimization of hyper parameters in machine learning typically includes a classical computer apparatus and a quantum optimizer in communication with the classical computer apparatus. The classical computer apparatus is configured for gathering data sets associated with an application, identifying parameters associated with the application, constructing a machine learning model using the data sets and the parameters, determining conditions associated with optimizing the machine learning model, transmitting the machine learning model, the data sets, and the conditions to the quantum optimizer. The quantum optimizer computing a set of optimal hyperparameters for the machine learning model based on the data sets and the conditions and transmitting the set of optimal hyperparameters to the classical computer apparatus.

17 Claims, 6 Drawing Sheets

200

(56)  References Cited

U.S. PATENT DOCUMENTS

| | | | |
|---|---|---|---|
| 11,551,129 | B2 | 1/2023 | Limberg et al. |
| 11,556,816 | B2 * | 1/2023 | Weidele ................. G06N 20/00 |
| 12,051,005 | B2 * | 7/2024 | Ronagh ................. G06N 3/092 |
| 2009/0070402 | A1 | 3/2009 | Rose et al. |
| 2019/0205790 | A1 | 7/2019 | Dukatz et al. |
| 2019/0224339 | A1 * | 7/2019 | Paul ................... A61K 48/0066 |
| 2021/0256416 | A1 * | 8/2021 | Bocharov .............. G06N 10/20 |
| 2022/0067040 | A1 | 3/2022 | Chen et al. |
| 2022/0149823 | A1 * | 5/2022 | Redmond .............. G06N 3/063 |
| 2022/0182152 | A1 | 6/2022 | Wang et al. |
| 2022/0198246 | A1 * | 6/2022 | Hibat Allah ............ G06F 17/18 |
| 2022/0335340 | A1 * | 10/2022 | Moustafa ............... G06N 20/00 |
| 2023/0297865 | A1 * | 9/2023 | Layden ................. G06N 10/20 |
| | | | 706/62 |

* cited by examiner

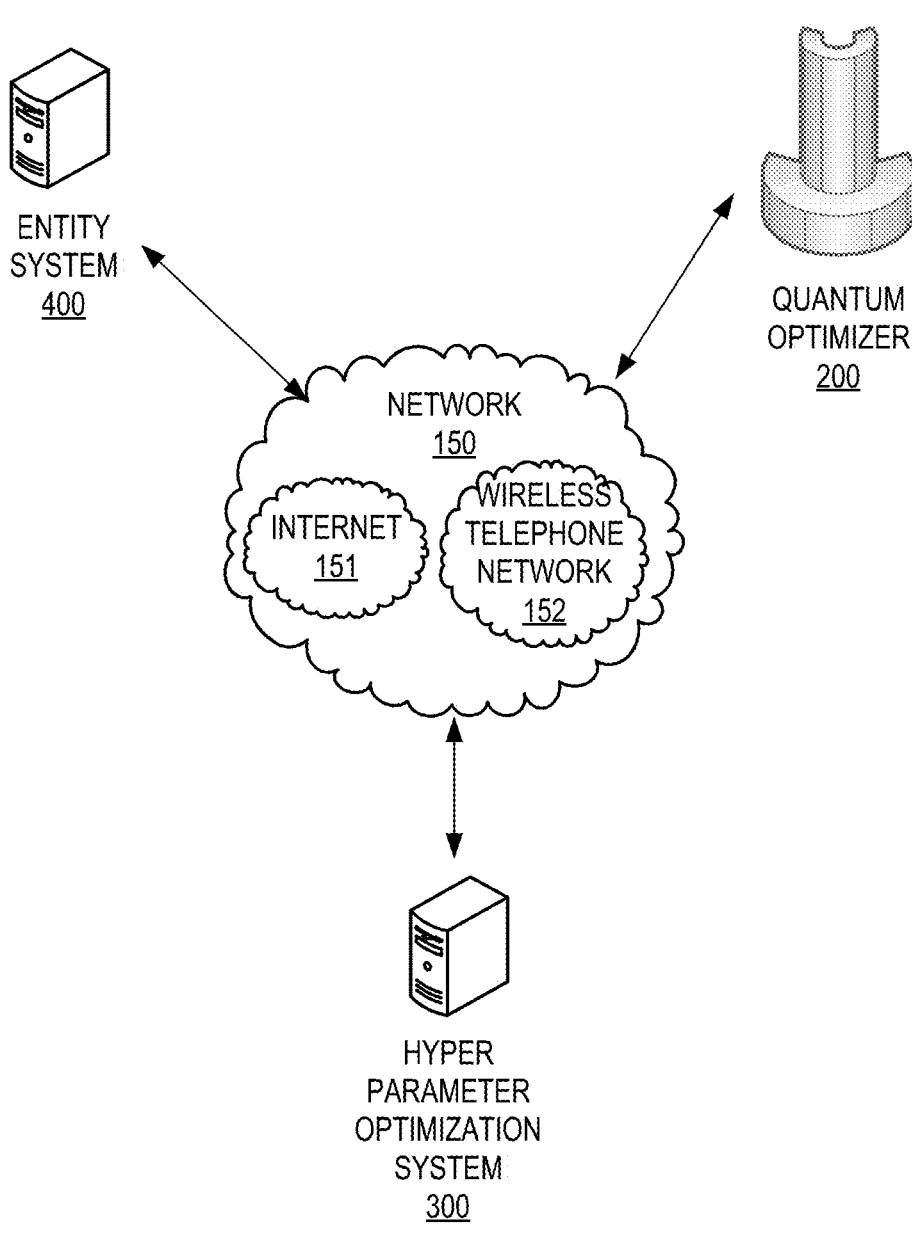
FIG. 1

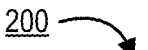
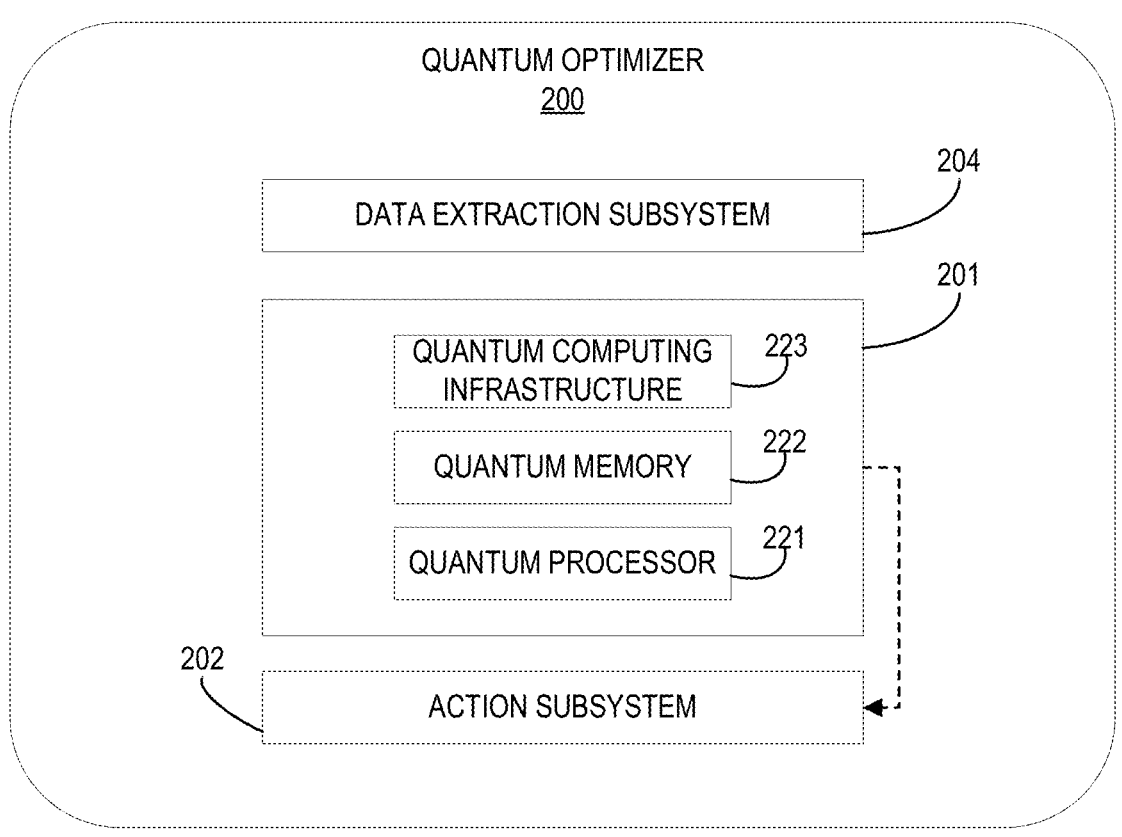
FIG. 2

300

HYPER PARAMETER OPTIMIZATION SYSTEM
300

NETWORK COMMUNICATION INTERFACE
310

PROCESSING DEVICE
320

MEMORY DEVICE
350

NETWORK SERVER APPLICATION 360

DATA TRANSFER APPLICATION 370

OPTIMIZATION APPLICATION 375

DATA CAPTURE APPLICATION 380

QUANTUM OPTIMIZER APPLICATION 383

MACHINE LEARNING MODELS 385

DATA REPOSITORY 390

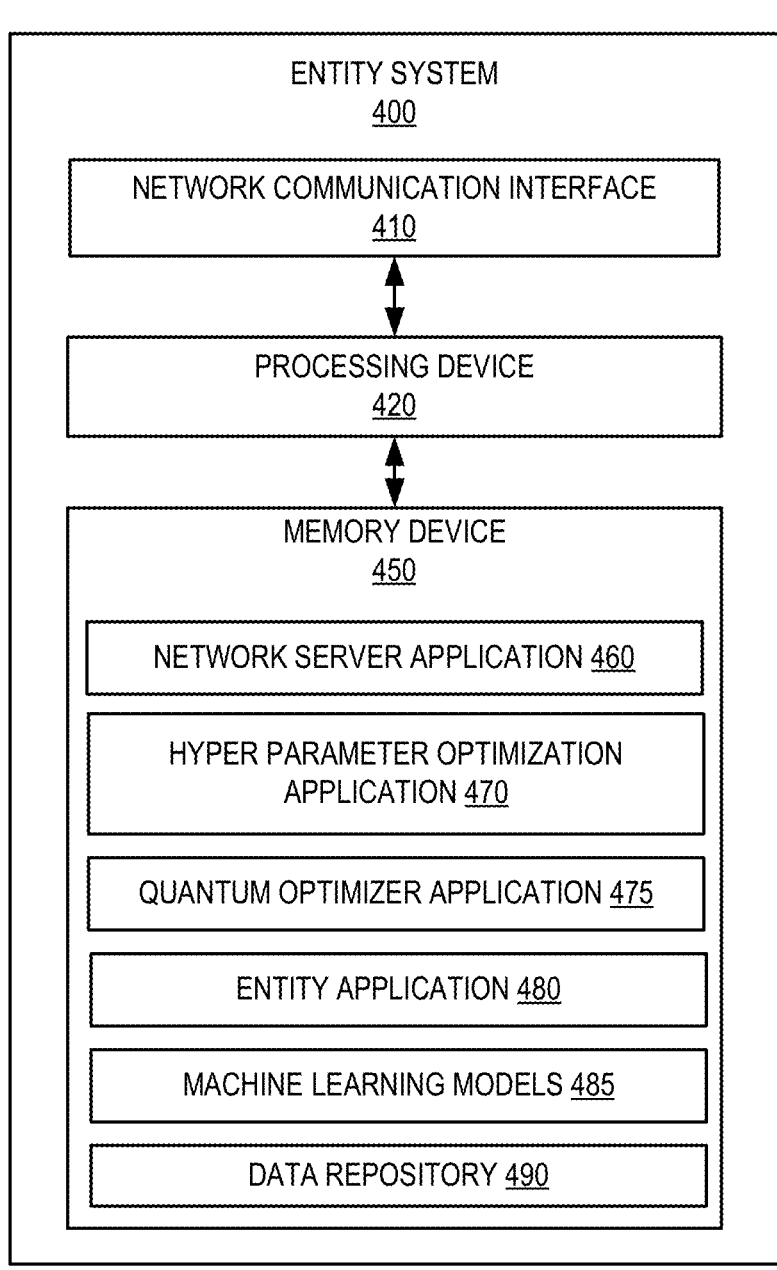
ENTITY SYSTEM
400
NETWORK COMMUNICATION INTERFACE
410
PROCESSING DEVICE
420
MEMORY DEVICE
450
NETWORK SERVER APPLICATION 460
HYPER PARAMETER OPTIMIZATION
APPLICATION 470
QUANTUM OPTIMIZER APPLICATION 475
ENTITY APPLICATION 480
MACHINE LEARNING MODELS 485
DATA REPOSITORY 490
FIG. 4

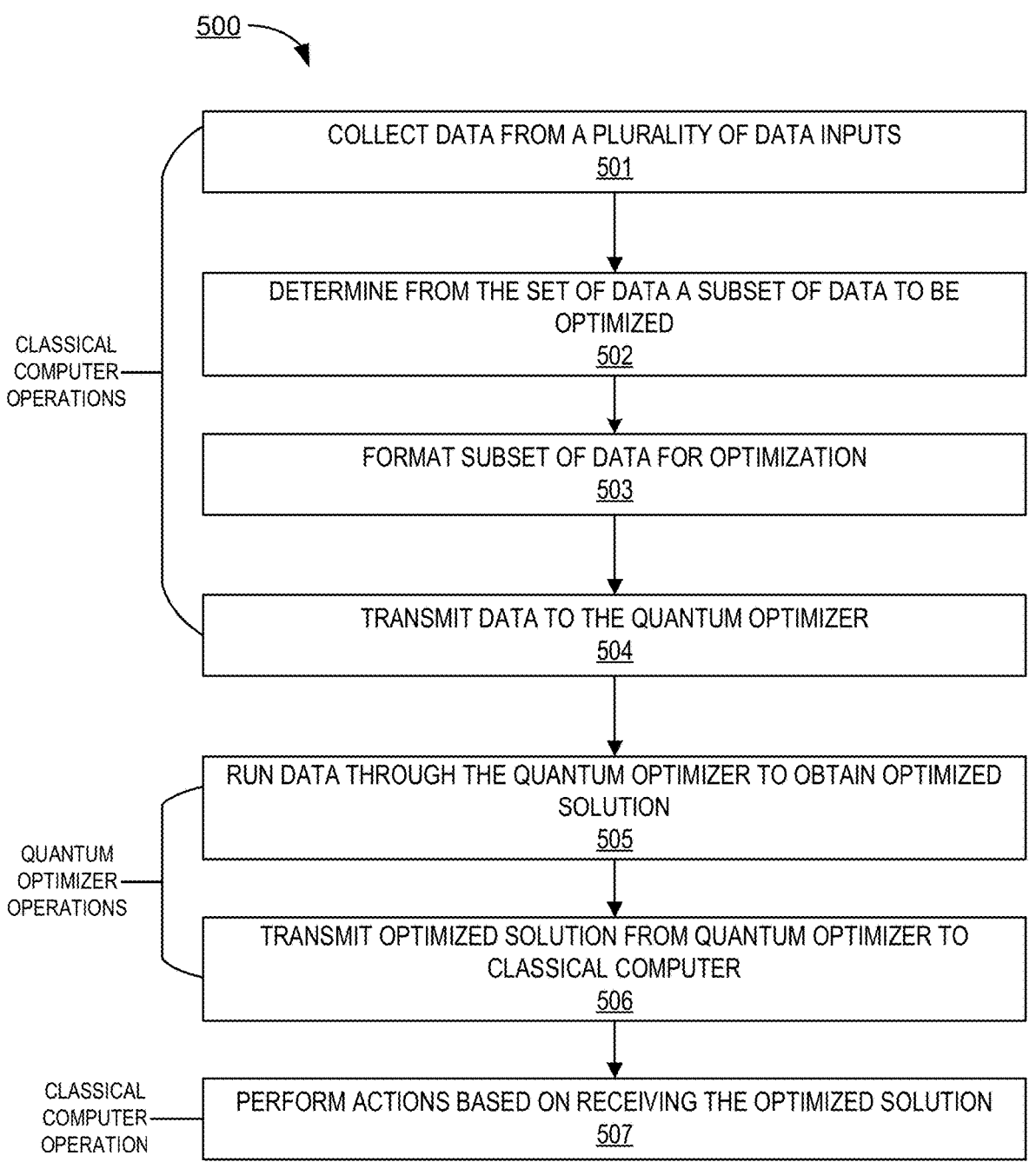

500

CLASSICAL COMPUTER OPERATIONS

COLLECT DATA FROM A PLURALITY OF DATA INPUTS
501

DETERMINE FROM THE SET OF DATA A SUBSET OF DATA TO BE OPTIMIZED
502

FORMAT SUBSET OF DATA FOR OPTIMIZATION
503

TRANSMIT DATA TO THE QUANTUM OPTIMIZER
504

QUANTUM OPTIMIZER OPERATIONS

RUN DATA THROUGH THE QUANTUM OPTIMIZER TO OBTAIN OPTIMIZED SOLUTION
505

TRANSMIT OPTIMIZED SOLUTION FROM QUANTUM OPTIMIZER TO CLASSICAL COMPUTER
506

CLASSICAL COMPUTER OPERATION

PERFORM ACTIONS BASED ON RECEIVING THE OPTIMIZED SOLUTION
507

FIG. 5

HYBRID QUANTUM COMPUTING SYSTEM FOR HYPER PARAMETER OPTIMIZATION IN MACHINE LEARNING

BACKGROUND

Conventional systems do not have the capability to improve the efficiency of machine learning models. As such, a need exists for an improved way of tuning and improving the efficiency of machine learning models.

SUMMARY

The following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments of the present invention address the above needs and/or achieve other advantages by providing apparatuses (e.g., a system, computer program product and/or other devices) and methods for performing optimization of hyper parameters in machine learning. In one aspect, the present invention embraces a computerized system, and an associated method and computer program product for performing optimization of hyper parameters in machine learning.

The system includes a classical computer apparatus and a quantum optimizer in communication with the classical computer apparatus. The classical computer apparatus comprising an optimization application is configured for gathering one or more data sets associated with an application, identifying one or more parameters associated with the application, constructing a machine learning model using a first part of the one or more data sets and the one or more parameters, determining one or more conditions associated with optimizing the machine learning model, and transmitting the machine learning model, the one or more data sets, and the one or more conditions to the quantum optimizer. The quantum optimizer in response to receiving the machine learning model, the one or more data sets, and the one or more conditions, retrieves a second part of the one or more data sets, computes a set of optimal hyperparameters for the machine learning model based on the second part of the one or more data sets and the one or more conditions, and transmits the set of optimal hyperparameters to the optimization application.

In some embodiments, the optimization application is configured for utilizing the set of optimal hyperparameters for the machine learning model to solve a problem associated with the application, via the machine learning model.

In some embodiments, the quantum optimizer is configured to computer the set of optimal hyperparameters, via quantum annealing method.

In some embodiments, the one or more conditions comprise at least one of minimizing a predefined function and maximizing a predefined function.

In some embodiments, the one or more data sets may comprise at least one of numerical data, numerical data, categorical data, time series data, and text data.

In some embodiments, the one or more data sets comprises the first part of the one or more data sets and the second part of the one or more data sets.

In some embodiments, the first part of the one or more data sets comprises the second part of the one or more data sets.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 3:
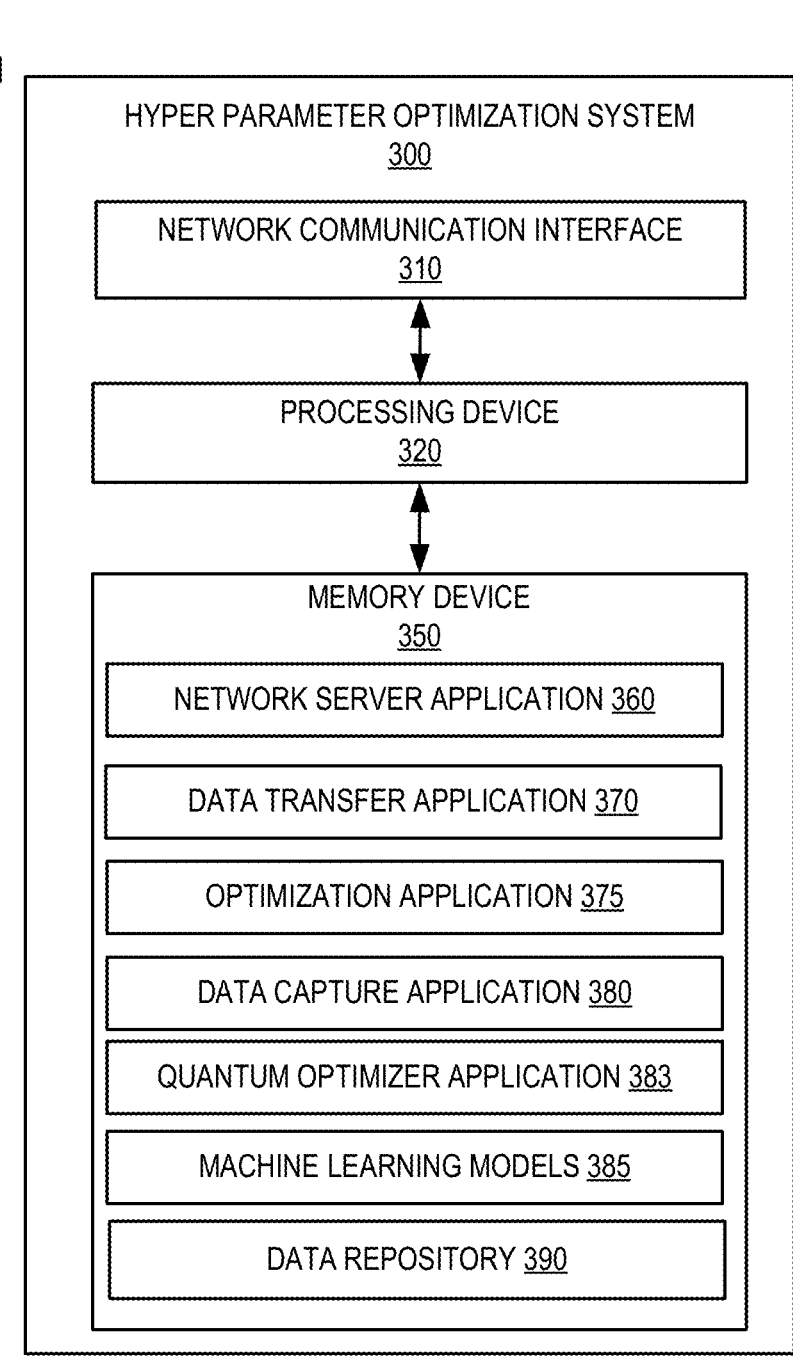
Figure 6:
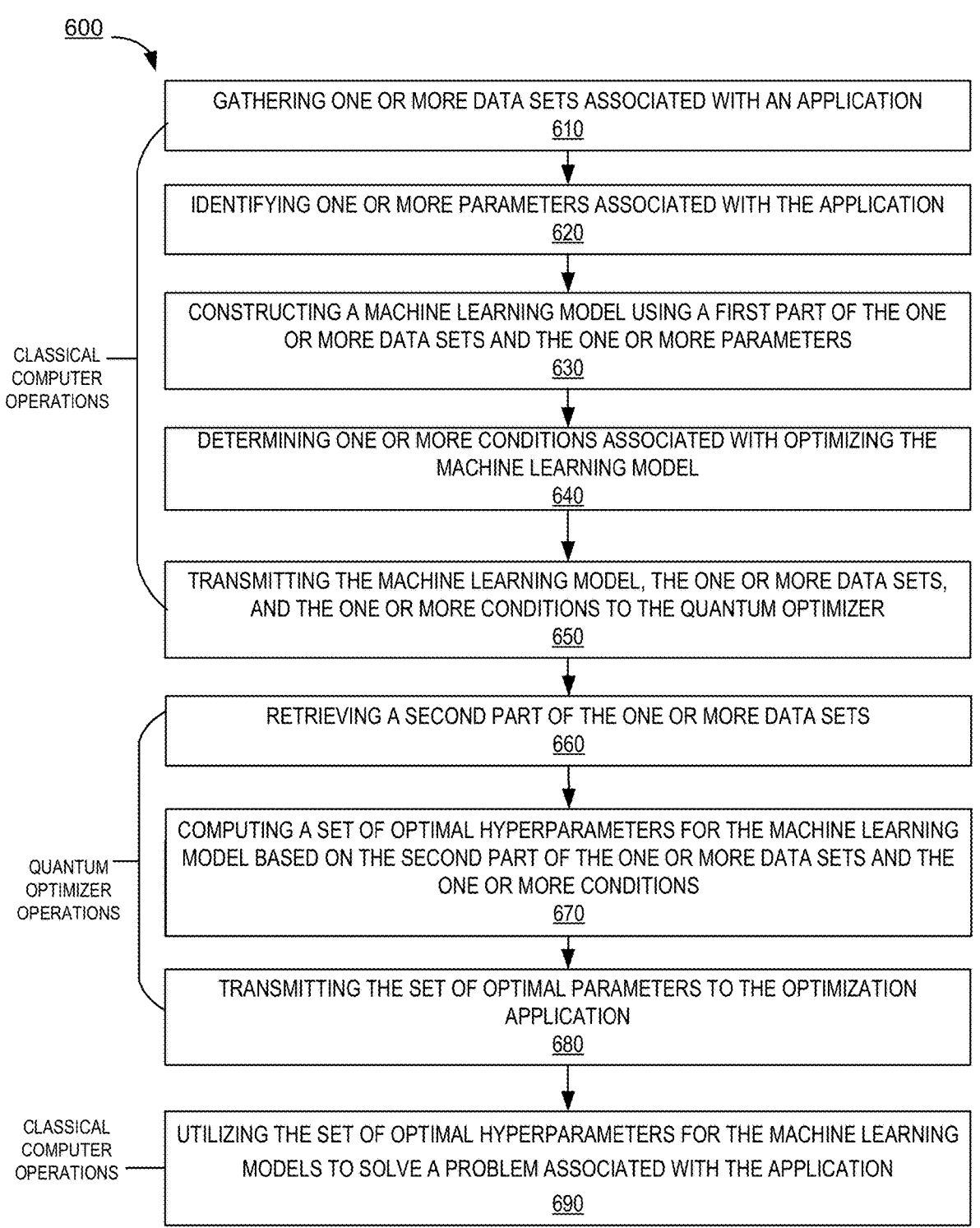

Having thus described some embodiments of the present invention in general terms, reference will now be made to the accompanying drawings, where:

FIG. 1 presents a technical components of a system for performing optimization of hyper parameters in machine learning, in accordance with an embodiment of the present invention;

FIG. 2 presents a block diagram illustrating the quantum optimizer of FIG. 1, in accordance with embodiments of the present invention;

FIG. 3 presents block diagram illustrating the hyper parameter optimization system of FIG. 1, in accordance with embodiments of the present invention;

FIG. 4 presents a block diagram illustrating the entity system(s) of FIG. 1, in accordance with embodiments of the present invention;

FIG. 5 presents a process flow illustrating the utilization of the quantum optimizer of FIG. 1, in accordance with embodiments of the present invention; and FIG. 6 presents a process flow for performing optimization of hyper parameters in machine learning, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

In accordance with embodiments of the invention, the terms "entity" may include any organization that processes financial transactions including, but not limited to, banks, credit unions, savings and loan associations, investment companies, stock brokerages, resource management firms, insurance companies and the like. In accordance with embodiments of the invention, the terms "third party system" and "other third party systems" may include any organizations including, but not limited to, photo identification issuing agencies, network managing organizations, email managing organizations, and/or the like. In some embodiments of the invention, the term "entity" may include any non-financial institution. In some embodiments, the term "entity" may include any organization that utilizes machine learning models for performing one or more organization activities.

A "system environment", as used herein, may refer to any information technology platform of an enterprise (e.g., a national or multi-national corporation) and may include a multitude of servers, machines, mainframes, personal computers, network devices, front and back end systems, database system and/or the like.

Many of the embodiments and example embodiments thereof described herein are directed towards solving a problem of optimizing the efficiency of machine learning models in real-time. Conventional systems do not have the capability to improve the efficiency of machine learning models. The present invention provides a solution to improve the efficiency of machine learning models by optimizing the hyper parameters used by the machine learning models.

FIG. 1 provides a block diagram illustrating an environment 100 for performing optimization of hyper parameters in machine learning. As depicted in FIG. 1, the operating environment 100 typically includes a hyper parameter optimization system 300 interacting with an entity system 400, a quantum optimizer 200, using a network 150. In some embodiments, the hyper parameter optimization system 300 may be maintained by the entity. In some embodiments, the hyper parameter optimization system 300 may be a part of the entity system 400. As further illustrated in FIG. 1, an exemplary quantum optimizer 200 that can be used in parallel with the hyper parameter optimization system 300 to solve optimization problems is presented. In this regard, the hyper parameter optimization system 300 may be used to perform classical digital processing tasks described in the present systems and methods.

The network 150 may be a system specific distributive network receiving and distributing specific network feeds and identifying specific network associated triggers. The network 150 may also be a global area network (GAN), such as Internet 151, a wide area network (WAN), a local area network (LAN), or any other type of network or combination of networks. The network 150 may provide for wireline, wireless, or a combination wireline and wireless communication between devices on the network 150. The network 150 may be a wireless telephone network 152.

FIG. 2 is a schematic diagram of an exemplary Quantum Optimizer 200 that can be used in parallel with a classical computer to solve optimization problems. The Quantum Optimizer 200 is comprised of a Data Extraction Subsystem 204, a Quantum Computing Subsystem 201, and an Action Subsystem 205. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 2, the Data Extraction Subsystem 204 communicates with the hyper parameter optimization system 300 to extract data for optimization. It will be understood that any method of communication between the Data Extraction Subsystem 204 and the network includes, but is not limited to wired communication, Radiofrequency (RF) communication, Bluetooth® WiFi, and the like. The Data Extraction Subsystem 204 then formats the data for optimization in the Quantum Computing Subsystem.

As further depicted in FIG. 2, the Quantum Computing Subsystem 201 comprises a Quantum Computing Infrastructure 223, a Quantum Memory 222, and a Quantum Processor 221. The Quantum Computing Infrastructure 223 comprises physical components for housing the Quantum Processor 221 and the Quantum Memory 222. The Quantum Computer Infrastructure 223 further comprises a cryogenic refrigeration system to keep the Quantum Computing Subsystem 201 at the desired operating conditions. In general, the Quantum Processor 221 is designed to perform adiabatic quantum computation and/or quantum annealing to optimize data received from the Data Extraction Subsystem 204. The Quantum Memory 222 is comprised of a plurality of qubits used for storing data during operation of the Quantum Computing Subsystem 201. In general, qubits are any two-state quantum mechanical system. It will be understood that the Quantum Memory 222 may be comprised of any such two-state quantum mechanical system, such as the polarization of a single photon, the spin of an electron, and the like.

The Action Subsystem 202 communicates the optimized data from the Quantum Computing Subsystem 201 back to the hyper parameter optimization system. It will be understood that any method of communication between the Data Extraction Subsystem 204 and the network includes, but is not limited to wired communication, Radiofrequency (RF) communication, Bluetooth® WiFi, and the like.

In accordance with the present systems and methods, an on-board quantum optimizer may be employed to perform real-time optimizations to hyper parameters of machine learning models more quickly and more reliably than a digital computing system. Because a quantum computing device inherently performs optimization in its natural evolution, quantum optimizer is particularly well-suited to solve optimization problems.

FIG. 3 presents a block diagram illustrating the hyper parameter optimization system 300, in accordance with embodiments of the invention. The hyper parameter optimization system 300 includes one or more processing devices 320 operatively coupled to a network communication interface 310 and a memory device 350. In certain embodiments, the hyper parameter optimization system 300 is operated by an entity, such as a financial institution. The hyper parameter optimization system 300 is configured to perform classical computer operations described in process flows of the present invention.

It should be understood that the memory device 350 may include one or more databases or other data structures/repositories. The memory device 350 also includes computer-executable program code that instructs the processing device 320 to operate the network communication interface 310 to perform certain communication functions of the hyper parameter optimization system 300 described herein. In one embodiment of the hyper parameter optimization system 300, the memory device 350 includes, but is not limited to, a network server application 360, a data transfer application 370, an optimization application 375, a data capture application 380, a quantum optimizer application 383, machine learning models 385, and a data repository 390 comprising any data received, extracted, transformed, processed, and/or the like by the hyper parameter optimization system 300. The computer-executable program code of the network server application 360, the data transfer application 370, the optimization application 375, the data capture application 380, the quantum optimizer application 383, and the machine learning models 385 may instruct the processing device 320 to perform certain logic, data-processing, and data-storing functions of the hyper parameter optimization system 300 described herein, as well as communication functions of the hyper parameter optimization system 300.

In some embodiments, the quantum optimizer application 383 allows communication with the quantum optimizer 200 using the network communication interface 310. The data transfer application 370 facilitates the transfer of data from the hyper parameter optimization system 300 to other systems on the network 150 and from the other system on the network 150 to the hyper parameter optimization system 300. The optimization application 375 is provided by the hyper parameter optimization system 300 for performing steps associated with process flows described in the present invention. In some embodiments, the optimization application 375 may include security mechanisms comprising functionalities of performing at least in part of the hyper parameter optimization process, and/or the like. The data capture application 380 may capture any data required by the hyper parameter optimization system 300 to perform one or more steps of the process flows described herein. In some embodiments, the one or more machine learning models 385 may be any models that the hyper parameter optimization system 300 is optimizing, where the one or more machine learning models 385 may received from the entity system 400.

As used herein, a "communication interface" generally includes a modem, server, transceiver, and/or other device for communicating with other devices on a network. The network communication interface 310 is a communication interface having one or more communication devices configured to communicate with one or more other devices on the network 150, such the quantum optimizer 200, and the entity system 400. The processing device 320 is configured to use the network communication interface 310 to transmit and/or receive data and/or commands to and/or from the other devices connected to the network 150.

FIG. 4 provides a block diagram illustrating the entity system 400, in greater detail, in accordance with embodiments of the invention. As illustrated in FIG. 4, in one embodiment of the invention, the entity system 400 includes one or more processing devices 420 operatively coupled to a network communication interface 410 and a memory device 450. In certain embodiments, the entity system 400 is operated by an entity, such as a financial institution. In certain embodiments, the entity system 400 is operated by an entity, such as a non-financial institution. In some embodiments, the entity system 400 may be operated by any entity that utilizes one or more machine learning models for performing one or more organizational activities.

It should be understood that the memory device 450 may include one or more databases or other data structures/repositories. The memory device 450 also includes computer-executable program code that instructs the processing device 420 to operate the network communication interface 410 to perform certain communication functions of the entity system 400 described herein. In one embodiment of the entity system 400, the memory device 450 includes, but is not limited to, a network server application 460, a hyper parameter optimization application 370, a quantum optimizer application 475, an entity application 480, a machine learning application 485, and a data repository 490 comprising data accessed, received, extracted, transformed, processed, and/or the like by the entity system 400 and any other computer-executable instructions or other data. The computer-executable program code of the network server application 460, the hyper parameter optimization application 370, the quantum optimizer application 475, the entity application 480, and the machine learning application 485 may instruct the processing device 420 to perform certain logic, data-processing, and data-storing functions of the entity system 400 described herein, as well as communication functions of the entity system 400. The hyper parameter optimization application 470 may be used by the entity system 400 to communicate with the hyper parameter optimization system 300.

As used herein, a "communication interface" generally includes a modem, server, transceiver, and/or other device for communicating with other devices on a network. The network communication interface 410 is a communication interface having one or more communication devices configured to communicate with one or more other devices on the network 150, such as the hyper parameter optimization system 300, quantum optimizer 200, and/or the other entity systems 401. The processing device 420 is configured to use the network communication interface 410 to transmit and/or receive data and/or commands to and/or from the other devices connected to the network 150.

FIG. 5 is a high level process flow of an embodiment of the present invention. FIG. 5 illustrates the interaction between a classical computer and the quantum optimizer 200 to solve an optimization problem. As depicted in FIG. 5, a classical computer begins the process flow 500 at step 501 by collecting data from a plurality of inputs. At step 502, the classical computer then determines from the set of data collected at step 501 a subset a data to be optimized. The classical computer then formats the subset of data for optimization at step 503. Formatting the subset of data may comprise converting the subset of data into a matrix format and converting the matrix to qubit sequences. At step 504, the classical computer transmits the formatted subset of data to the Quantum Optimizer 200. The Quantum Optimizer 200 runs the data to obtain the optimized solution at 505. The Quantum Optimizer 200 then transmits the optimized data back to the classical computer at step 506. Finally, the classical computer can perform actions based on receiving the optimized solution at step 507.

FIG. 6 presents a process flow 600 for performing optimization of hyper parameters in machine learning, in accordance with embodiments of the present invention. The system of the present invention works with a quantum optimizer to implement one or more steps of the process flow 600. As shown in block 610, the classical computer comprising an optimization application (e.g., optimization application 375), gathers one or more data sets associated with an application. The application(s) may be any applications that utilize machine learning models to automatically analyze data and make predictions and/or patterns. Some examples of applications of machine learning may include, but are not limited to, image recognition, speech recognition, traffic prediction, product recommendations, automotive industry, financial industry, cybersecurity, exposure analysis, patient care industry, automatic language translation, and/or the like. The one or more data sets may comprise any data associated with solving a problem associated with the applications. The one or more data sets may comprise any data, including, but not limited to, numerical data, categorical data, time series data, text data, and/or the like.

As shown in block 620, the optimization application identifies one or more parameters associated with the application. The one or more parameters may be any variables that has an impact on the resulting machine learning model. In some embodiments, the one or more parameters may comprise hyperparameters, where the hyperparameters are higher level parameters that control the machine learning model. In some embodiments, the one or more parameters are all hyperparameters. In some embodiments, one or more users (e.g., Machine Learning Engineer) may choose the one or more parameters. Examples of parameters may include, but are not limited to, model architecture, learning rate, number of epochs, number of branches in a decision tree, number of clusters in a clustering algorithm, and/or the like. An Epoch defines the number times that the learning algorithm will work through the entire training dataset.

As shown in block 630, the optimization application constructs a machine learning model using a first part of the one or more data sets and the one or more parameters. In some embodiments, the classical computer may use 80% of the one or more datasets to construct the machine learning model. In some embodiments, since the process of constructing the machine learning model is computing intensive and require parallel processing, the classical computer may transmit the one or more data sets and the one or more parameters to the quantum optimizer and the quantum optimizer constructs the machine learning model efficiently. Construction/building of the machine learning model may comprise exploring and identifying a type of machine learning model that is required for the problem associated with the application. In some embodiments, one or more users may provide inputs associated with selecting the type of the machine learning models. In some embodiments, the system (also referred to as classical computer in some instances) automatically selects the type of the machine learning model. The type of machine learning models may comprise a supervised machine learning model, an unsupervised machine learning model, and a reinforcement machine learning model. Construction/building of the machine learning model may further comprise retrieving a first part of data from the one or more data sets, preparing the first part of the one or more datasets, cleaning the first part of the one or more data sets, and building the model using the cleaned first part of the one or more data sets.

As shown in block 640, the optimization application determines one or more conditions associated with optimizing the machine learning model. The one or more conditions may comprise minimizing a predefined function and maximizing a predefined function. In some embodiments, the predefined function may be an error function. In some embodiments, the one or more users may provide the one or more conditions. In some embodiments, the system may automatically identify and extract the one or more conditions form a data repository. As shown in block 650, the optimization application transmits the machine learning model, the one or more data sets, and the one or more conditions to the quantum optimizer.

As shown in block 660, the quantum optimizer retrieves a second part of the one or more data sets. In response to receiving the machine learning model, the one or more data sets, and the one or more conditions, the quantum optimizer retrieves a second part of the one or more data sets. In some embodiments, the second part of the data may comprise the remaining 20% of the one or more data sets as discussed in block 630. In some embodiments, the optimization application may retrieve the second part of data from the one or more data sets and transmit it to the quantum optimizer. In some embodiments, the one or more data sets comprises the first part of the one or more data sets and the second part of the one or more data sets. In some embodiments, the first part of the one or more data sets comprises the second part of the one or more data sets.

As shown in block 670, the quantum optimizer computes a set of optimal hyperparameters for the machine learning model based on the second part of the one or more data sets and the one or more conditions. In some embodiments, the quantum optimizer computes the set of optimal hyperparameters for the machine learning model to either minimize/maximize the predefined function. In some embodiments, the quantum optimizer may use a grid search, a random search, a Bayesian optimization method, a gradient based optimization method, an evolutionary optimization method, a population-based method, an early stopping-based method, and/or the like for performing optimization of hyperparameters. In exemplary embodiments, the quantum optimizer may use quantum annealing method for optimizing the machine learning model. The quantum optimizer computes the resource intensive process of computing the set of optimal hyperparameters, thereby improving the overall efficiency of the system and the classical computer apparatus.

As shown in block 680, the quantum optimizer transmits the set of optimal hyperparameters to the optimization application. As shown in block 690, the optimization application utilizes the set of optimal hyperparameters for the machine learning models to solve a problem associated with the application.

In one example, the process flow 600 described in FIG. 6 may be applied to an application in financial sector, where machine learning models may be utilized by a financial organization to perform exposure analysis associated with approving financial loans to one or more customers. In such an embodiment, the system gathers one or more data sets associated with the financial data of the customers, credit rating of the customers, historical data associated with the approval of one or more historical financial loans, and the one or more customers, and/or the like. The system upon gathering the data, may identify one or more parameters associated with performing exposure analysis and builds a machine learning model utilizing the one or more datasets and the one or more parameters. The system may then determine one or more conditions associated with optimizing the machine learning model and transmits the machine learning model, the one or more data sets, the one or more parameters, and the one or more conditions to a quantum optimizer. In response, the quantum optimizer may compute a set of hyperparameters to optimize the machine learning model and transmits the set of hyperparameters and/or the optimized machine learning model back to the system. Upon receiving the set of hyperparameters and/or the optimized machine learning model from the quantum optimizer, the system utilizes the optimized machine learning model to calculate an exposure rating associated with approval of a financial loan to a customer.

In another example, the process flow 600 described in FIG. 6 may be applied to another application in financial sector, where machine learning models may be utilized by a financial organization to recommend one or more financial products to one or more customers. In such an embodiment, the system gathers one or more data sets associated with the one or more financial products, user data associated with the one or more customers, historical data associated with the usage of the one or more financial products and the one or more customers, and/or the like. The system upon gathering the data, may identify one or more parameters associated with providing recommendations and builds a machine learning model utilizing the one or more datasets and the one or more parameters. The system may then determine one or more conditions associated with optimizing the machine learning model and transmits the machine learning model, the one or more data sets, the one or more parameters, and the one or more conditions to a quantum optimizer. In response, the quantum optimizer may compute a set of hyperparameters to optimize the machine learning model and transmits the set of hyperparameters and/or the optimized machine learning model back to the system. Upon receiving the set of hyperparameters and/or the optimized machine learning model from the quantum optimizer, the system utilizes the optimized machine learning model to recommend the one or more financial products to the one or more customers.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer system for performing optimization of hyper parameters in machine learning, comprising:
   a classical computer apparatus comprising:
      a processor;
      a memory; and
      an optimization application that is stored in the memory and executable by the processor;
   a quantum optimizer in communication with the classical computer apparatus, the quantum optimizer comprising:
   a quantum processor; and
   a quantum memory;
   wherein the optimization application is configured for:
      gathering one or more data sets associated with an application;
      identifying one or more parameters associated with the application, wherein the one or more parameters are hyperparameters that control machine learning models, wherein the hyperparameters comprise model architecture, learning rate, number of epochs, number of branches in a decision tree, and number of clusters in a clustering algorithm;
      automatically select a machine learning model type for constructing a machine learning model;
      constructing the machine learning model based on the machine learning model type using a first part of the one or more data sets and the one or more parameters, wherein the one or more parameters have an impact on an optimized version of the machine learning model;
      determining one or more conditions associated with optimizing the machine learning model;
      transmitting the machine learning model, the one or more data sets, and the one or more conditions to the quantum optimizer;
   wherein the quantum optimizer is configured for:
      in response to receiving the machine learning model, the one or more data sets, and the one or more conditions, retrieving a second part of the one or more data sets;
      computing a set of optimal hyperparameters for the machine learning model based on the second part of the one or more data sets and the one or more conditions; and
      transmitting the set of optimal hyperparameters to the optimization application; and
   wherein the optimization application is configured for:
      utilizing the set of optimal hyperparameters for the machine learning model to create the optimized version of the machine learning model for solving a problem associated with the application, via the machine learning model.

2. The computer system of claim 1, wherein the quantum optimizer is configured to computer the set of optimal hyperparameters, via quantum annealing method.

3. The computer system of claim 1, wherein the one or more conditions comprise at least one of minimizing a predefined function and maximizing the predefined function.

4. The computer system of claim 1, wherein the one or more data sets may comprise at least one of numerical data, numerical data, categorical data, time series data, and text data.

5. The computer system of claim 1, wherein the one or more data sets comprises the first part of the one or more data sets and the second part of the one or more data sets.

6. The computer system of claim 1, wherein the first part of the one or more data sets comprises the second part of the one or more data sets.

7. A computer program product for performing optimization of hyper parameters in machine learning, comprising a non-transitory computer-readable storage medium having computer-executable instructions for causing a classical computer apparatus comprising an optimization application to:

gather one or more data sets associated with an application;

identify one or more parameters associated with the application, wherein the one or more parameters are hyperparameters that control machine learning models, wherein the hyperparameters comprise model architecture, learning rate, number of epochs, number of branches in a decision tree, and number of clusters in a clustering algorithm;

automatically select a machine learning model type for constructing a machine learning model;

construct the machine learning model based on the machine learning model type using a first part of the one or more data sets and the one or more parameters, wherein the one or more parameters have an impact on an optimized version of the machine learning model;

determine one or more conditions associated with optimizing the machine learning model;

transmit the machine learning model, the one or more data sets, and the one or more conditions to a quantum optimizer;

wherein the quantum optimizer is configured for:

in response to receiving the machine learning model, the one or more data sets, and the one or more conditions, retrieving a second part of the one or more data sets;

computing a set of optimal hyperparameters for the machine learning model based on the second part of the one or more data sets and the one or more conditions; and transmitting the set of optimal hyperparameters to the optimization application; and wherein the optimization application is configured for:

utilizing the set of optimal hyperparameters for the machine learning model to create the optimized version of the machine learning model for solving a problem associated with the application, via the machine learning model.

8. The computer program product of claim 7, wherein the quantum optimizer is configured to compute the set of optimal hyperparameters, via quantum annealing method.

9. The computer program product of claim 7, wherein the one or more conditions comprise at least one of minimizing a predefined function and maximizing the predefined function.

10. The computer program product of claim 7, wherein the one or more data sets may comprise at least one of numerical data, numerical data, categorical data, time series data, and text data.

11. The computer program product of claim 7, wherein the one or more data sets comprises the first part of the one or more data sets and the second part of the one or more data sets.

12. A method for performing optimization of hyper parameters in machine learning, comprising:

gathering, via a classical computer apparatus, one or more data sets associated with an application;

identifying, via the classical computer apparatus, one or more parameters associated with the application, wherein the one or more parameters are hyperparameters that control machine learning models, wherein the hyperparameters comprise model architecture, learning rate, number of epochs, number of branches in a decision tree, and number of clusters in a clustering algorithm;

automatically selecting a machine learning model type for constructing a machine learning model;

constructing, via the classical computer apparatus, the machine learning model based on the machine learning model type using a first part of the one or more data sets and the one or more parameters, wherein the one or more parameters have an impact on an optimized version of the machine learning model;

determining, via the classical computer apparatus, one or more conditions associated with optimizing the machine learning model;

transmitting, via the classical computer apparatus, the machine learning model, the one or more data sets, and the one or more conditions to a quantum optimizer;

in response to receiving the machine learning model, the one or more data sets, and the one or more conditions, retrieving, via the quantum optimizer, a second part of the one or more data sets;

computing, via the quantum optimizer, a set of optimal hyperparameters for the machine learning model based on the second part of the one or more data sets and the one or more conditions;

transmitting, via the quantum optimizer, the set of optimal hyperparameters to the optimization application; and utilizing, via the classical computer apparatus, the set of optimal hyperparameters for the machine learning model to create the optimized version of the machine learning model for solving a problem associated with the application, via the machine learning model.

13. The method of claim 12, wherein quantum optimizer is configured to compute the set of optimal hyperparameters, via quantum annealing method.

14. The method of claim 12, wherein the one or more conditions comprise at least one of minimizing a predefined function and maximizing the predefined function.

15. The method of claim 12, wherein the one or more data sets may comprise at least one of numerical data, numerical data, categorical data, time series data, and text data.

16. The method of claim 12, wherein the one or more data sets comprises the first part of the one or more data sets and the second part of the one or more data sets.

17. The method of claim 12, wherein the first part of the one or more data sets comprises the second part of the one or more data sets.

* * * * *